(12) United States Patent
Shigeno et al.

(10) Patent No.: US 6,247,093 B1
(45) Date of Patent: Jun. 12, 2001

(54) DATA PROCESSING APPARATUS FOR EXECUTING SYNCHRONOUS INSTRUCTIONS PRIOR TO EXECUTING ASYNCHRONOUS INSTRUCTIONS

(75) Inventors: Takeshi Shigeno; Takashi Morikawa, both of Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/011,757

(22) PCT Filed: Sep. 1, 1995

(86) PCT No.: PCT/JP95/01747

§ 371 Date: Oct. 8, 1998

§ 102(e) Date: Oct. 8, 1998

(87) PCT Pub. No.: WO97/09674

PCT Pub. Date: Mar. 13, 1997

(51) Int. Cl.[7] .................................................. G06F 15/00
(52) U.S. Cl. ........................................... 710/263; 712/244
(58) Field of Search .................................. 712/228, 229, 712/244; 710/260, 263, 264

(56) References Cited

U.S. PATENT DOCUMENTS 5,265,257 * 11/1993 Simcoe et al. .
5,301,331 * 4/1994 Ueno et al. ........................... 710/260
5,386,560 * 1/1995 McCauley et al. ................... 711/165
5,410,655 * 4/1995 Greenfield et al. ...................... 710/5
5,442,802 * 8/1995 Brent .................................... 709/100

* cited by examiner

Primary Examiner—John F. Niebling
Assistant Examiner—S. Whitmore
(74) Attorney, Agent, or Firm—Antonelli, Terry, Stout & Kraus, LLP

(57) ABSTRACT

A data processing apparatus has a basic processing unit (BPU) 2, a channel processor (CHP) 10, message channel units (MCH) 11n, message channel receivers (MCHR) 6m connected respectively to the message channel units 11n, and a structured external storage device (SES) 6 which may be connected to a plurality of hosts via the message channel receivers 6m and which includes a cache memory 8 for accommodating data shared by the hosts. Before issuing a synchronous instruction, a program issues an instruction notifying in advance the inventive apparatus of the intended use of hardware resources. When the hardware resources are reserved by the notifying instruction, the apparatus guarantees the subsequent execution of the synchronous instruction. Because synchronous instructions are always carried out, the system overhead is lowered.

5 Claims, 9 Drawing Sheets

MESSAGE NOTIFICATION INSTRUCTION

CONDITION CODE = 0; END
≠0; UNDEFINED

TEST AND RESERVE INSTRUCTION

CONDITION CODE = 0; BUFFER AVAILABLE
= 2; BUFFER UNAVAILABLE
≠0, 2; UNDEFINED

DATA PROCESSING APPARATUS FOR EXECUTING SYNCHRONOUS INSTRUCTIONS PRIOR TO EXECUTING ASYNCHRONOUS INSTRUCTIONS

TECHNICAL FIELD

The present invention relates to a data processing apparatus that is capable of executing instructions either synchronously or asynchronously. More particularly, the invention relates to a data processing apparatus which allows either synchronous or asynchronous execution of instructions to be designated by a program, whereby the hardware may execute instructions either synchronously or asynchronously.

BACKGROUND OF THE INVENTION

In general, instructions are executed either synchronously or asynchronously. That is, hardware conventionally executes program instructions either in synchronism therewith or in an asynchronous fashion. However, a data processing system is disclosed in Japanese Patent Laid-Open No. Hei 6-4490 which executes instructions both synchronously and asynchronously. In manipulating messages, the disclosed system uses a SEND MESSAGE instruction that may be executed synchronously or asynchronously. Message manipulation is started and controlled by the SEND MESSAGE instruction and by information from a message manipulation block in main storage. The manipulation consists of executing the command designated in a message command block. Response information generated by the message manipulation is placed into a message response block in the main storage. An A bit (asynchronous bit) in the message manipulation block, designated by a program, causes a message sending function to be carried out either synchronously or asynchronously with respect to the SEND MESSAGE instruction. Specifically, the message sending function is executed in synchronism with the SEND MESSAGE instruction when the A bit is set to 0, and it is executed asynchronously if the A bit is set to 1. The SEND MESSAGE instruction designates one inter-system (I/S) subchannel for message manipulation involving the transfer of data, the message and a response between systems.

The execution of a message manipulation may involve a plurality of sending buffers paired with a plurality of receiving buffers. A typical setup for use with the paired buffers is disclosed in Japanese Patent Laid-Open No. Hei 6-85877 as "Data processing system having high-performance communication channels and operation recovery method for use with the same."

A program may issue an asynchronous SEND MESSAGE instruction to an I/S subchannel (No.=a) of a message channel unit. In such a case, if the message channel unit is currently executing a SEND MESSAGE instruction on another I/S subchannel, the channel unit is busy with respect to the received asynchronous SEND MESSAGE instruction and does not execute the latter. Then the SEND MESSAGE instruction designated for the I/S subchannel (No.=a) in question is entered into a process queue within the system. Thereafter, the instruction is dequeued from the queue for reexecution. When an attempt is made to reexecute the SEND MESSAGE instruction on the targeted I/S subchannel (No.=a), the channel unit may still be executing another SEND MESSAGE instruction on another I/S subchannel. In that case, the SEND MESSAGE instruction is again placed into the process queue in the system. The steps are repeated until the SEND MESSAGE instruction in question is carried out. The concept involved in the above process is the same as that of asynchronous instructions for known I/O operations.

Unlike the asynchronous SEND MESSAGE instruction, a synchronous SEND MESSAGE instruction designated for one I/S subchannel cannot be executed by the message channel unit if the channel unit is carrying out another SEND MESSAGE instruction on another I/S subchannel. This is because the SEND MESSAGE instruction, synchronous in nature, cannot be placed into a process queue. In that case, the attempt to execute the instruction fails and the failure is reported to the program.

One message channel unit may be shared by a plurality of operating systems, as disclosed by Japanese Patent Laid-Open No. Hei 6-35725 in the form of "Method and system for sharing input/output resources." When one operating system issues an instruction to such a shared message unit, another operating system may be already occupying the message channel unit. Thus, the possibility of the synchronous SEND MESSAGE instruction being unexecutable is even higher than otherwise. A failure to execute any synchronous SEND MESSAGE instruction requires suitable processing for recovery. The result is a lower level of system efficiency.

The data processing system disclosed in Japanese Patent Laid-Open No. Hei 6-4490 provides means for synchronously performing message handling in order to reduce the system overhead. The disclosed system is thus likely to encounter more cases of handling synchronous SEND MESSAGE instructions. As mentioned, the synchronous SEND MESSAGE instruction is more likely to be denied execution than the asynchronous SEND MESSAGE instruction.

The "data processing system having high-performance communication channels and operation recovery method for use with the same" disclosed in Japanese Patent Laid-Open No. Hei 6-85877 involve the use of a plurality of sending buffers in a message channel path unit. The sending buffers are paired with a plurality of receiving buffers located inside a structured external storage device. The sending-receiving buffer pairs correspond to a plurality of message manipulations. In this setup, one message channel unit is supposed to permit multiple message manipulations. However, since none of the pairs of sending and receiving buffers is assigned specifically to synchronous SEND MESSAGE instructions, if all buffer pairs happen to be busy, it is still impossible to execute any synchronous SEND MESSAGE instruction.

It is therefore an object of the present invention to reduce the probability that synchronous SEND MESSAGE instructions cannot be executed.

SUMMARY OF INVENTION

In carrying out the invention and according to one aspect thereof, there is provided a data processing apparatus which has hardware resources for executing instructions from a program synchronously and asynchronously and which allows either the synchronous or the asynchronous execution of instructions to be designated by an instruction from the program, the data processing apparatus comprising: queuing and executing means for entering an asynchronous instruction issued by the program into a queue and later executing the asynchronous instruction using the hardware resources at an appropriate time; notifying means for allowing the program to notify in advance the hardware resources of the execution of a synchronous instruction; and checking means for checking the status of notification in effect when an asynchronous instruction is to use the hardware resources.

In a preferred structure according to the invention, before issuing a synchronous instruction, the program is allowed to issue an instruction giving advance notice to the data processing apparatus of the intended use of the hardware resources. Given the notifying instruction, the apparatus reserves the hardware resources for executing the synchronous instruction in question. The reserved status is not canceled until the synchronous instruction has been executed. This boosts the probability of the synchronous instruction being executed.

BEST MODE FOR CARRYING OUT THE INVENTION

Figure 1:
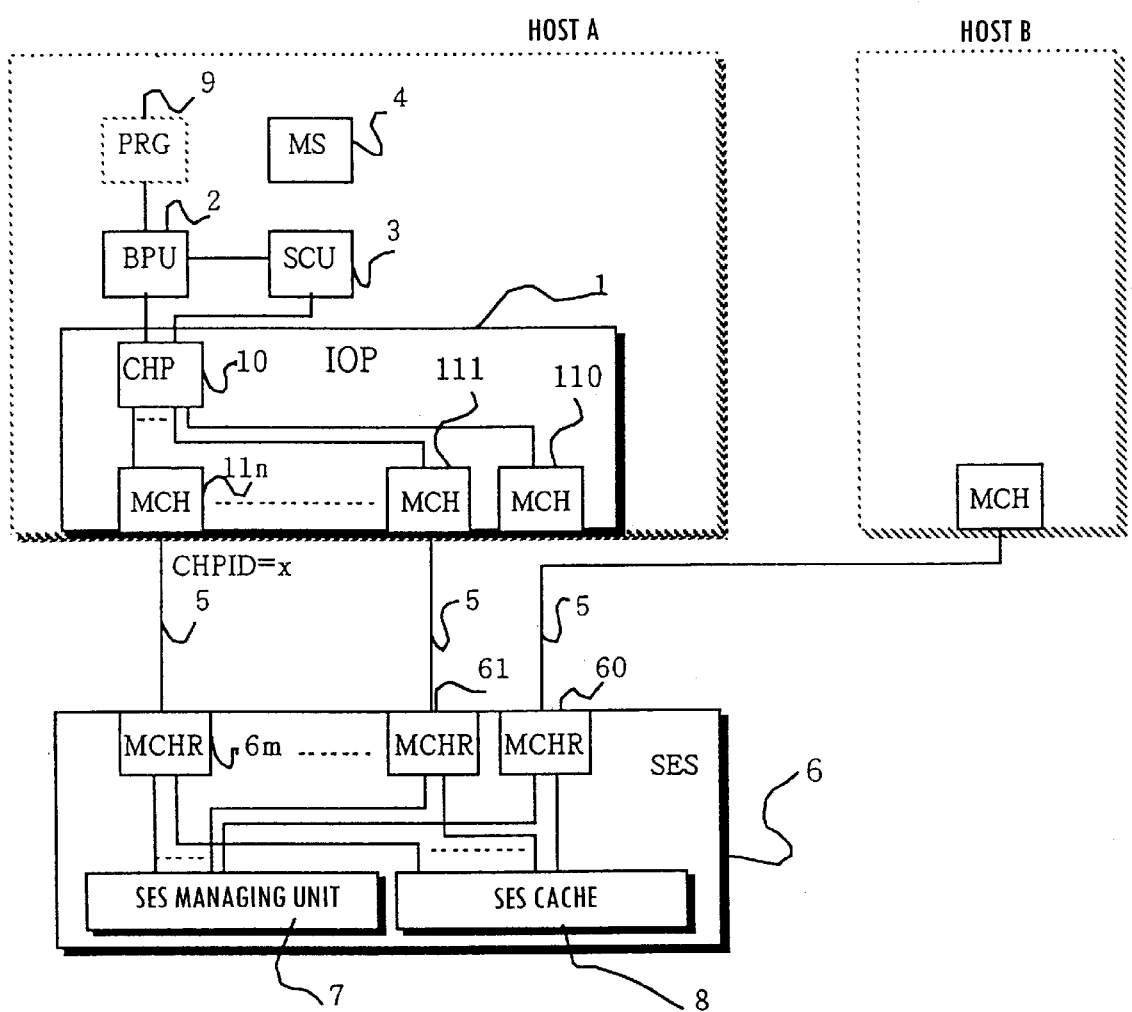
FIG. 1 is a system block diagram of an embodiment of the invention.
Figure 4:
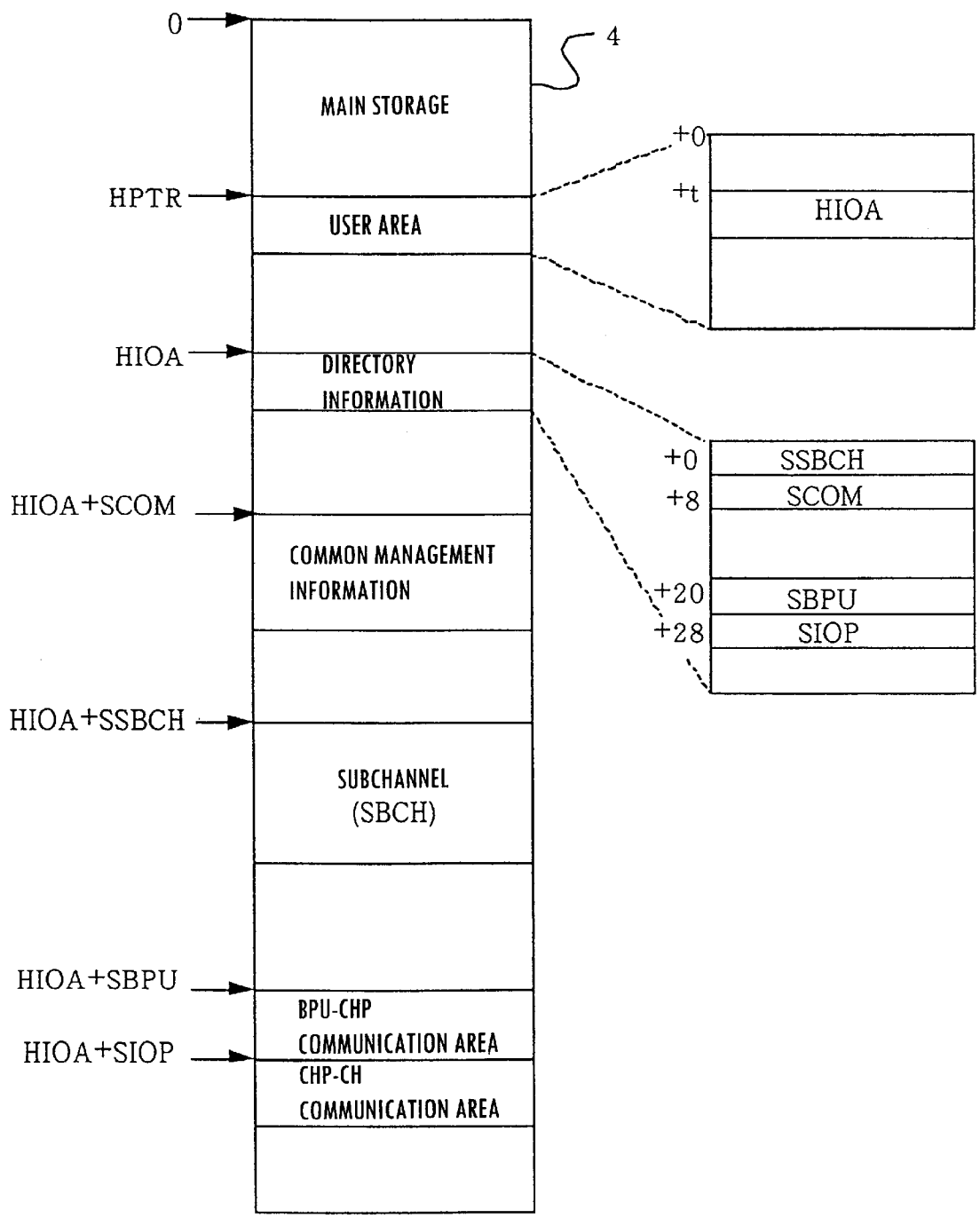
FIG. 4 is a diagram showing a format of a main storage (MS)

FIG. 1 illustrates the constitution of a data processing apparatus embodying the invention. In FIG. 1, hosts A and B are each connected to a structured external storage device (called SES hereunder) 6. The hosts A and B each comprise an input/output processor (called IOP) 1 including a channel processor (CHP) 10 that selects and manages message channel paths 5, and message channel units (MCHs) 11n each controlling a single message channel ("n" representing the message channel number corresponding to each CHP). Each MCH is assigned a logical channel number (CHPID; "x" for MCH 11n), i.e., a channel path number recognized by a program (PRG) 9. Each IOP (i.e., CHP and CH inside) is connected to a storage control unit (SCU) 3 for controlling a main storage (MS) 4 and to a basic processing unit (BPU) 2. The BPU 2 is a processor that carries out various instructions issued by the PRG 9. Given instructions from the PRG 9, the BPU 2 may activate CHPs and MCHs. The MS 4 may be accessed through the SCU 3 by the CHPs and MCHs inside the IOP 1 as well as by the BPU 2. The MS 4 is divided internally into two major areas: a user area handled by the PRG 9, and a hardware-dedicated area (HSA) exploited by hardware, such as the BPU 2 and IOP 1. FIG. 4 illustrates a format of the MS 4. Details of the format will be described later.

A plurality of instructions held in the PRG 9 are executed successively by the BPU 2. In the case of a synchronous instruction, its termination equals the end of its processing. That is, the termination of execution of a synchronous instruction corresponds to an end of the processing triggered by the instruction, which is followed by the issuance of an instruction in the next step. On the other hand, the termination of execution of an asynchronous instruction does not parallel the end of the processing started by the instruction in question. That is, the processing of an asynchronous instruction has yet to end when another instruction is issued in the next step. When the PRG 9 terminates the execution of a synchronous instruction, the program enters the next step, but the hardware (BPU 2, IOP 1, etc.) is still carrying out the instruction in question. At the end of the processing of the asynchronous instruction, the hardware notifies the PRG 9 thereof. Given the end-of-processing notice, the PRG 9 verifies the end of the asynchronous instruction in question. One known means for finding out the status of instruction execution involves the use of a condition code. One common condition code is represented by two bits that are set immediately after the end of the instruction execution.

The PRG 9 may utilize the resources of the computer system via the BPU 2. The PRG 9 is also allowed to access the SES 6 through message channel paths 5. The SES contains an SES managing unit 7 that manages the SES as a whole, an SES cache 8 that holds shared data, and message channel receivers (MCHRs) 60 through 6m. These MCHRs are connected to the MCHs via the message channel paths 5. The SES 6 may be connected to a plurality of hosts (via MCHs and MCHRs). The data shared by the group of hosts are retained in the SES cache 8.

Figure 2:
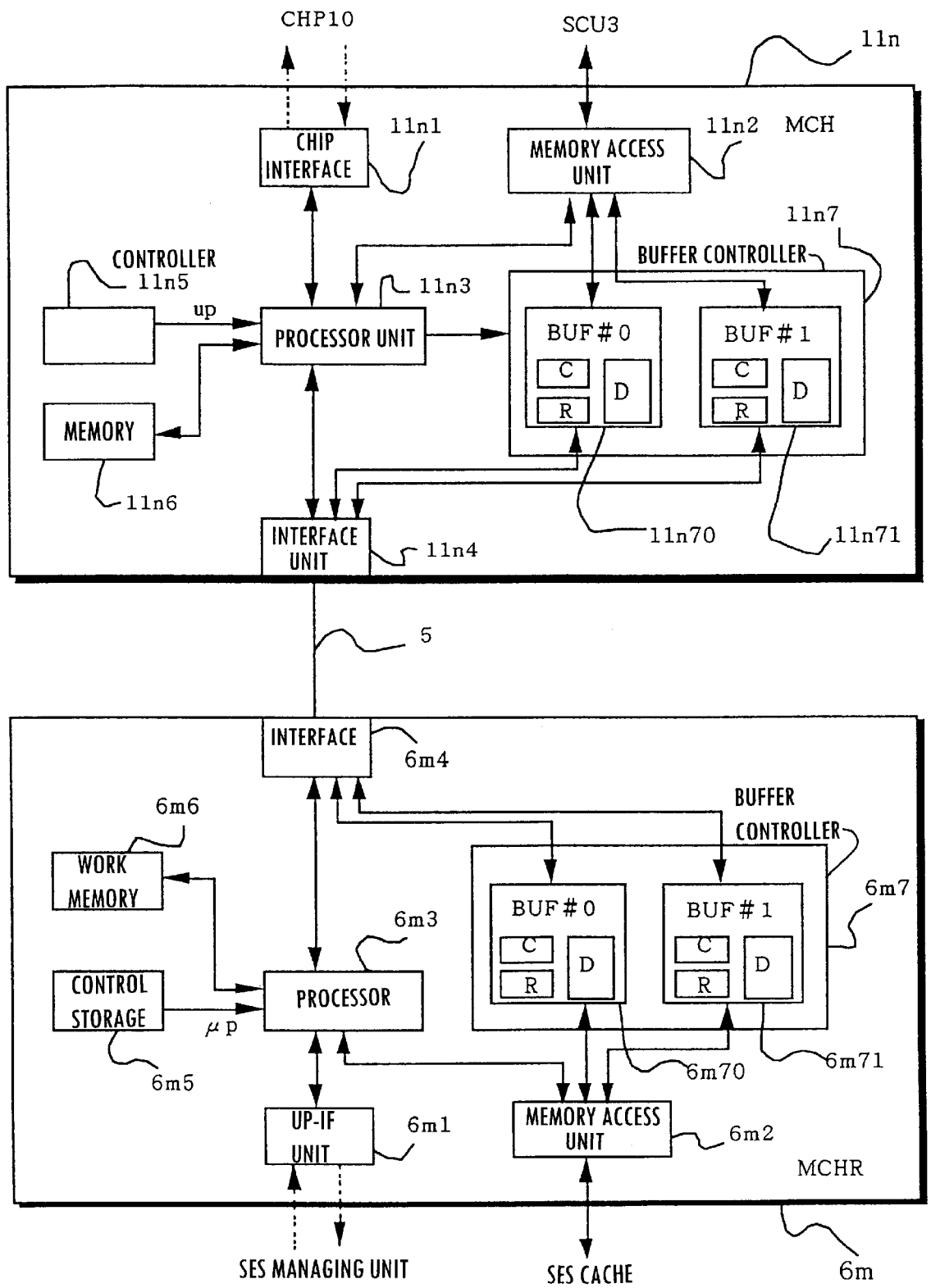
FIG. 2 is a schematic view block diagram of a message channel unit and a message channel receiver in the embodiment of FIG. 1.

FIG. 2 outlines typical constitutions of the MCH 11n and MCHR 6m. The MCH 11n includes a control storage (CS) 11n5 that stores microprograms 譏 for controlling the MCH 11n, a processor unit 11n3 that controls the MCH 11n under the microprograms 譏 a work memory 11n6 used by the microprograms 譏 for processing, a CHP interface (CHP-IF) 11n1 that handles communication with the CHP 10, a memory access unit 11n2 for gaining access to the MS 4 via the SCU 3, an interface unit (IF) 11n4 that is connected to the message channel path 5 and interfaces to the MCHR 6m, and a buffer controller 11n 7 that transfers data involved in message transmissions. The buffer controller 11n7 includes two buffers (BUF #0–11n70, BUF #1–11n71) each capable of executing one SEND MESSAGE instruction from the PRG 9 under the direction of the processor unit 11n3. It follows that one MCH 11n may execute two SEND MESSAGE instructions simultaneously. Each of the buffers in the MCH 11N comprises a command part C, a data part D and a response part R.

The MCHR 6m in the SES 6 comprises an interface unit 6m4 which is connected to a message channel path 5 and which interfaces to the MCH 11n, a control storage (CS) 6m5 that stores microprograms 譏 for controlling the MCHR 6m, a processor unit 6m3 that controls the MCHR 6m in accordance with the microprograms 譏, a work memory unit 6m6 used by the microprograms 譏 for processing, a UP-IF unit 6m1 that handles communication with the SES managing unit 7, a memory access unit 6m2 for accessing the SES cache 8, and a buffer controller 6m7 that transfers data involved in message transmissions. The buffer controller 6m7 includes two buffers (BUF #0–6m70, BUF #1–6m71) that correspond respectively to the buffers (BUF #0–11n70, BUF #1–11n71) in the MCH 11n. Illustratively, when the MCH 11n carries out a message operation using the BUF #1–11n71, the MCHR 6m executes the corresponding message operation using the BUF #1–6m71; when the MCH 11n conducts a message operation by utilizing the BUF #0–11n70, the MCHR 6m performs the corresponding message operation by resorting to the BUF #0–6m70. In this setup, each buffer in the MCHR 6m also comprises a command part C, a data part D and a response part R.

How messages are exchanged between the MCH 11n and the MCHR 6m will now be outlined. When sending a message to the MCHR 6m, the MCH 11n selects one of the two buffers inside. It is assumed here that the BUF #0–11n70 is selected. The MCH 11n then sets a command of the necessary message operation in the command part C of the BUF #0–11n70. From there, the command is placed onto the message channel path 5 via the interface unit 11n4. Past the message channel path 5, the command is received by the interface unit 6m4 of the MCHR 6m and stored into the command part C of the BUF #0–6m70. If the command represents a write operation from the MCH 11n to the MCHR 6m, data is retrieved from the data part C of the BUF #0–11n70 in the MCH 11n. The retrieved data is placed into the data part D of the BUF #0–6m70 in the MCHR 6m. If the command denotes a read operation, data is retrieved from the data part D of the BUF #0–6m70 in the MCHR upon receipt of the command by the MCHR 6m and; the retrieved data is set to the data part D of the BUF #0–11n70 in the MCH 11n.

At the end of the message operation, status data is set in the response part R of the BUF #0–6m70 in the MCHR 6m, and the status is sent onto the message channel path 5. From there, the status is set to the response part R of the BUF #0–11n70 in the MCH 11n. This terminates the message exchange between the MCH 11n and the MCHR 6m. Message commands are always initiated from the MCH side and never from the MCHR side. Thus, the buffers held by the MCH side are called active buffers, and those retained by the MCHR side are referred to as passive buffers.

Two unidirectional signal lines are connected interposingly between the MCH 11n and the CHP 10, one line being directed from the MCH to the CHP and the other from the CHP to the MCH. The two signal lines are connected to the CHP interface 11n1, usually carrying a value of 0 each. The CHP 10 thus has two unidirectional signal lines each directed differently and connected to each MCH. For each channel under its subordinate MCH, the CHP thus has two unidirectional signal lines, one line directed from the CHP to the MCH and the other from the MCH to the CHP.

When requesting a CHP to perform processing, the MCH places a 1 onto the signal line leading to the CHP. If the CHP 10 finds the requested processing executable, the CHP places a 1 onto the signal line leading to the MCH. On recognizing the value 1 on the signal line, the corresponding MCH places a 0 onto the signal line leading to the CHP. On verifying the value 0 on the signal line from the MCH, the CHP 10 also places a 0 onto the signal line leading to the MCH. When recognizing the value 0 on the signal line from the CHP, the MCH in question writes the requested data to a CHP-MCH communication area (see FIG. 4) in the MS 4. After the write operation, the MCH again places a 1 onto the signal line leading to the CHP. When ascertaining the value 1 on the signal line 1, the CHP reads the MCH-requested data from the CHP-MCH communication area in the MS 4. With the requested data thus read, the CHP 10 places a 1 onto the signal line leading to the MCH. On checking the value 1 on the signal line, the corresponding MCH sets to 0 the signal line leading to the CHP. In turn, the CHP 10 places a 0 onto the signal line leading to the MCH. The above sequence is reversed when the CHP 10 requests the MCH to perform processing.

The manner in which data is communicated between the CHP and the BPU is the same as in the above-described processing regarding the MCH. The CHP and the BPU are connected by two unidirectional signal lines, one line directed from the CHP to the BPU, the other from the BPU to the CHP. The MS 4 contains a BPU-CHP communication area (see FIG. 4).

FIG. 4 shows a typical format of the MS 4. The MS 4 is broadly divided into a program utilization area used by programs and a hardware-dedicated area (HSA). In this embodiment, a pointer (a hardware pointer called HPTR) divides the storage in two; the area higher than the pointer is used by hardware, and the area lower than the pointer is used by programs. The HPTR is set when power is applied and may vary depending on the configuration information or the like assigned to the system. IOP-related information is stored in an area pointed to by a pointer (a hardware I/O address called HIOA) positioned at an address determined relative to the HPTR (HPTR+t in the example of FIG. 4). The HIOA contains relative pointers to various kinds of information (i.e., addresses relative to the HIOA taken as zero). These pointers are generically called directory information. By use of these pointers, the BPU 2, CHP 10 and each MCH update and refer to necessary information.

What follows is a description of how the PRG 9, BPU 2, CHP 10, MCH 11n and MCHR 6m operate when the PRG 9 in the host A of FIG. 1 issues a SEND MESSAGE instruction.

Figure 10:
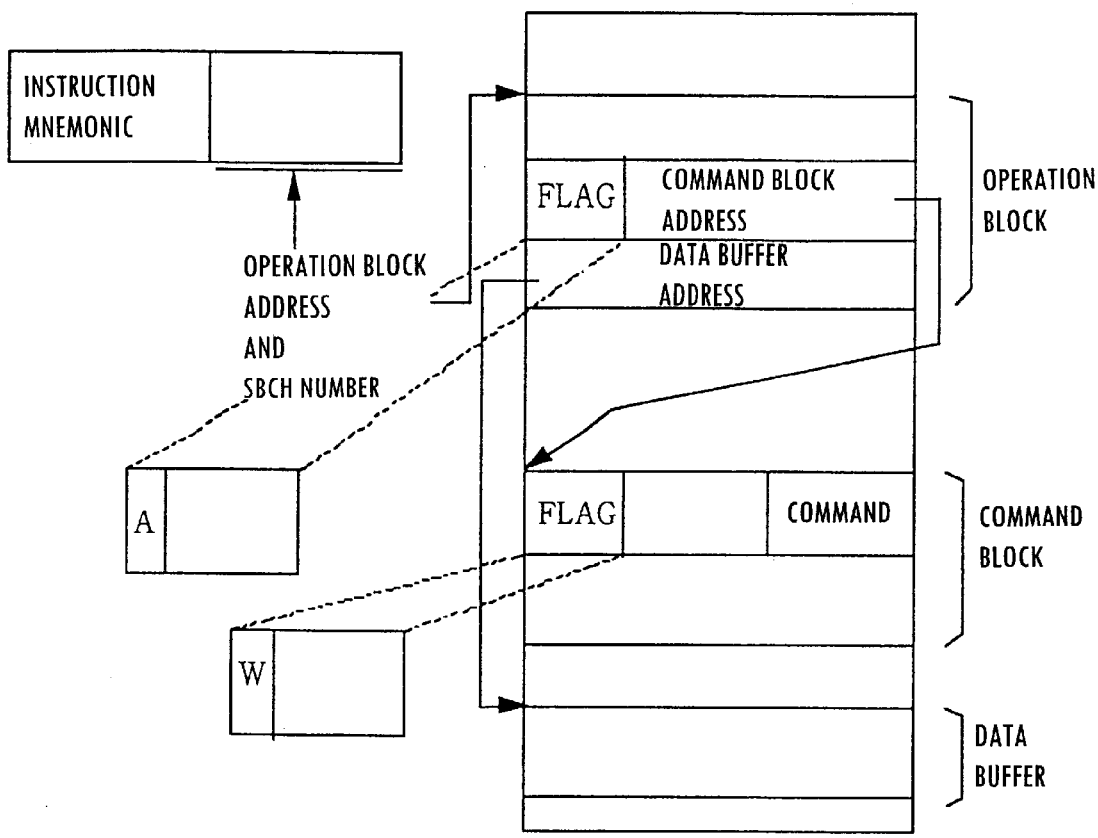
FIG. 10 is a diagram of a processing operand in a SEND MESSAGE instruction.

FIG. 10 illustrates typical information set by the PRG 9 when the SEND MESSAGE instruction is issued. Before issuing the SEND MESSAGE instruction, the PRG 9 establishes an operation block, a command block and a data buffer (or area in which to place data from the MCHR 6m in the case of a read operation) in a given user area of the MS 4. The operation block includes a flag having the A bit indicating whether the message operation in question is synchronous or asynchronous, an address at which the command block is located (i.e., command block address), and an address at which the data buffer is positioned (data buffer address). The message operation is asynchronous when the A bit of the flag is set to 1 and synchronous when the A bit is set to 0. The command block includes a command representing the message operation in question, and a flag having a W bit indicating whether the message operation is a write or a read operation. The operation is a write operation when the W bit of the flag is found to be 1 and a read operation when the W bit is 0. When the W bit is 1 in the command block, the data to be sent to the SES 6 is set in the data buffer. When the W bit is 0, the data buffer is secured as a location in which to place the data sent from the SES 6. An operand of the SEND MESSAGE instruction specifies two settings: the number (called SBCH number) of a message subchannel (called SBCH) for holding information that is managed by the BPU 2 and IOP 1 in executing the operation in question, and the address of a user area in the operation block of the MS 4. An SBCH entry is stored in the HSA area inside the MS 4.

The BPU 2 acquires the SBCH entry in the HSA from the SBCH number in the SEND MESSAGE instruction issued by the PRG 9. The SBCH is acquired specifically as follows: an address SSBCH is retrieved from the directory information in the location indicated by the HIOA in the MS 4. The SSBCH is a relative address indicating the beginning of an HIOA-headed area containing an SBCH group. The SBCH in question is held at the address defined as HIOA+SSBCH+SBCH number×128.

Figure 5:
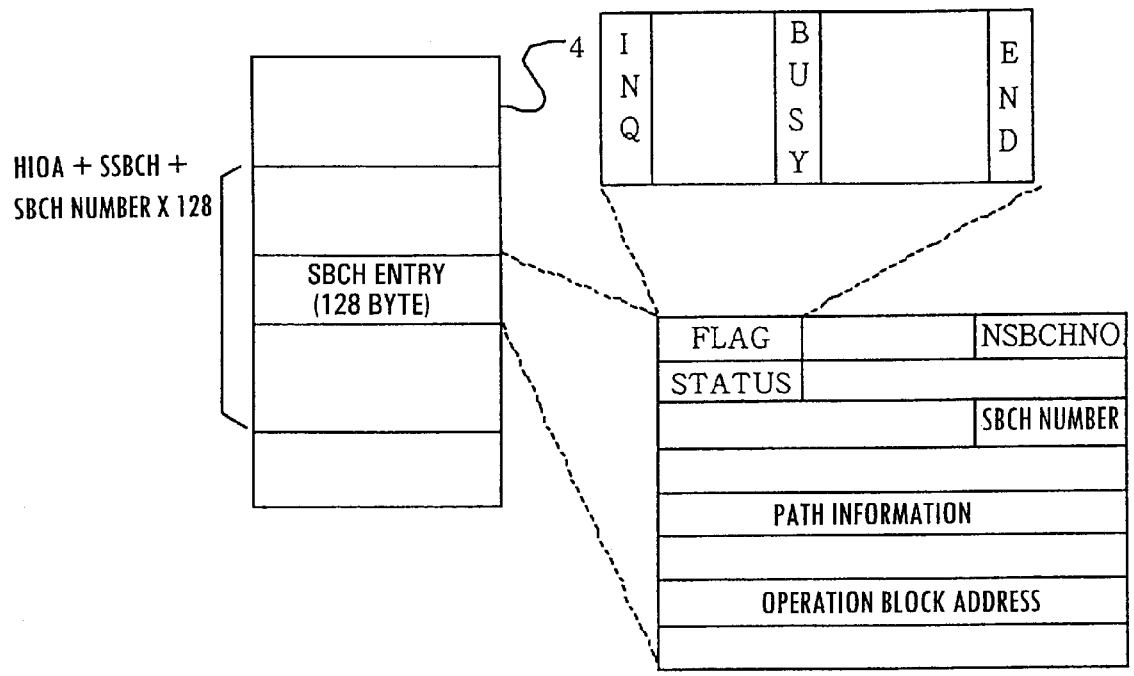
FIG. 5 is a diagram showing a format of a message subchannel (SBCH)
Figure 7:
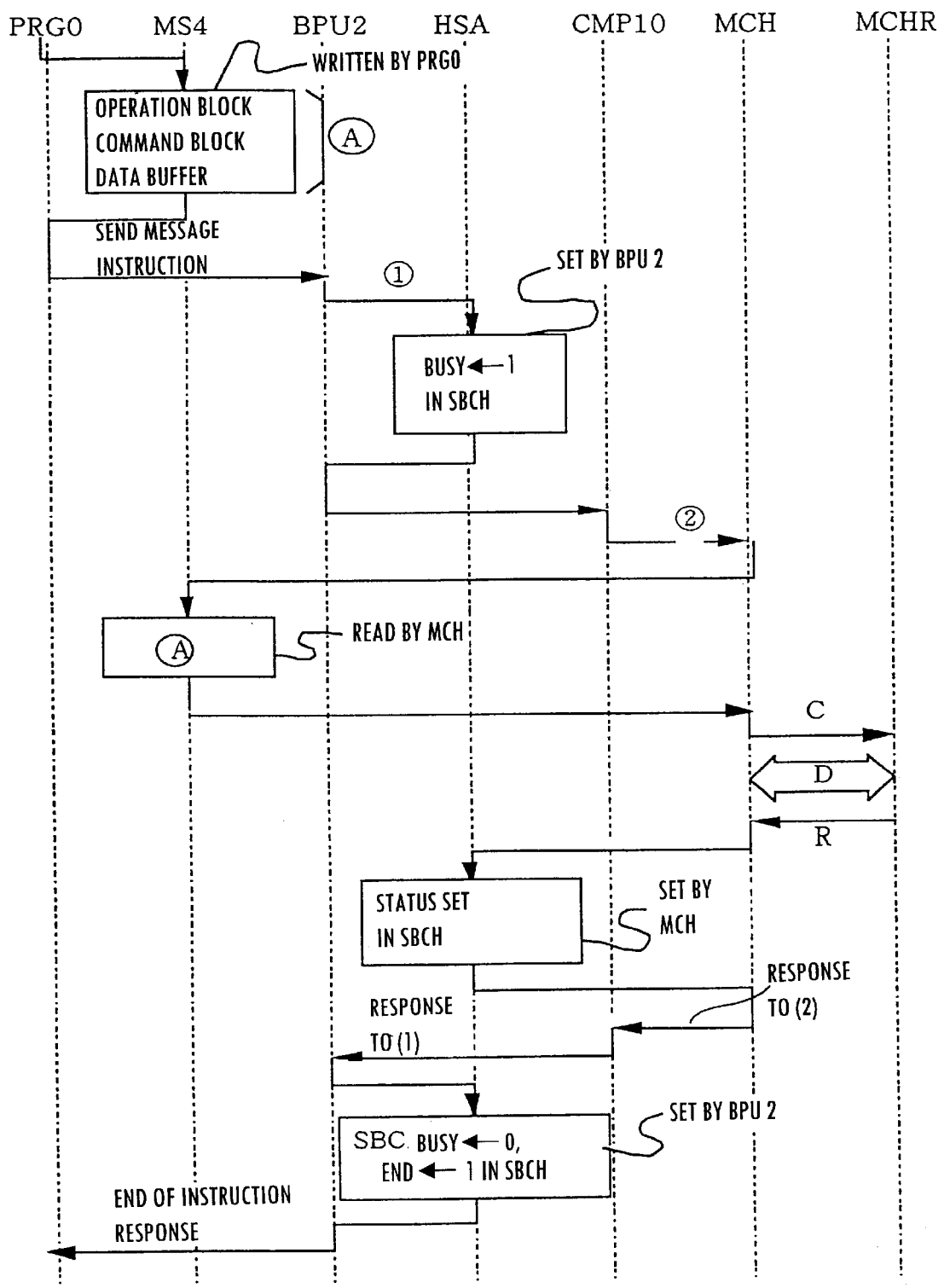
FIG. 7 is a timing chart of synchronous processing sequences.

Details of the SBCH entry are shown in FIG. 5. The SBCH entry comprises a flag, an NSCBHNO field, a status field, an SBCH number, path information containing the identification (CHPID) of the message channel unit capable of handling the SBCH in question, and an operation block address for storage in case of an asynchronous operation. The flag field includes three bits: an INQ bit indicating that an asynchronous SEND MESSAGE instruction is issued to the SBCH in question and that the instruction is entered into a queue waiting for execution, a BUSY bit indicating that the SBCH is being executed, and an END bit indicating that the SBCH has terminated the SEND MESSAGE instruction in question and is waiting for a check from the PRG 9. The NSBCHNO field accommodates the SBCH number located next in the queue when an asynchronous SEND MESSAGE instruction is issued and the INQ bit of the flag is set to 1. When the END bit of the flag is set to 1, the status field indicates in what status the SEND MESSAGE instruction has ended. All flag bits of the SBCH are zero if the PRG 9 issues an ordinary message operation start command. If any flag bit is not zero, the BPU 2 returns an invalid condition code as soon as the PRG 9 issues the SEND MESSAGE instruction, whereby the PRG 9 is notified of the failure of the instruction. With the SEND MESSAGE instruction issued, the BPU 2 references the SBCH as described above and checks to see if the operation in question is executable. Each SBCH may be referenced by the PRG 9 via the BPU 2. If the operation is judged to be executable, the BUSY bit of the flag for the SBCH is set to 1. Thereafter, based on the operation block address in the operand of the SEND MESSAGE instruction issued by the PRG 9, the BPU 2 references the flag field of the operation block. If the A bit of the flag is found to be 1, the operation is judged to be synchronous and the CHP 10 is started by the above-mentioned means. At this point, the CHPID designated by the BPU 2 is selected from the path information held in he corresponding SBCH, and the selected information is sent to the CHP 10. The CHP 10 is further informed of the operation block address and SBCH number furnished by the PRG 9. When started in this manner, the CHP 10 activates the appropriate MCH 11n based on the information from the BPU 2 and, using the above-described means, supplies the NMCH 11n with all information presented by the BPU 2. When thus started, the MCH 11n acquires an operation block, a command block and a data buffer from the MS 4. On the as is of the information acquired, the MCH 11n performs command, data and response-related operations as described above regarding the MCHR 6m on the side of the SES 6. Which of the two buffers inside the MCH 11n is to be used is determined by which of the buffers is currently in use. If a given buffer is in use, the corresponding BUSY bit of the flag is set to 1 in a buffer management information area in the work memory 11n6 of the MCH 11n in FIG. 3. The buffer management information area exists in each of the buffers BUF #0–11n70 and BUF #1–11n71 and has the same format. When activated by the CHP 10, the MCH 11n references the BUSY bit of the flag in the buffer management information area corresponding to the BUF #0–11n70. If the referenced BUSY bit is found to be 0, the BUF #0 is selected, and the initiated message operation is executed. If the BUSY bit is found to be 1, the MCH 11n references the BUSY bit of the flag in the buffer management information area corresponding to the BUF #1–11n71. If the referenced BUSY bit is found to be 0, the BUF #1 is selected, and the initiated message operation is carried out. If the BUSY bit representing the BUF #1 is found to be 1, the MCH 11n is incapable of executing the message operation in question. When the MCH 11n finds that the message operation is nonexecutable, the MCH 11n notifies the CHP 10 thereof by means of the CHP-MCH interface described above. Given the operation-nonexecutable response, the CHP 10 checks the operation block of the message operation in question and references the A bit therein. If the A bit is found to be 0, the message operation is judged to be a synchronous operation. In that case, the CHP 10 supplies the BPU 2 with a response indicative of the operation-nonexecutable information from the MCH 11n. Upon receipt of that response from the CHP, the BPU 2 sets to 0 the BUSY bit of the flag in the SBCH regarding the synchronous operation, sets the END bit therein to 1, and writes status data indicating that the operation has failed because the buffers are busy. Then, the BPU 2 returns an end-of-instruction response to the PRG 9. The PRG 9 reads the returned SBCH information, checks the end-of-instruction status and recognizes the failure of the operation. With the SBCH information read in, the BPU 2 clears the flag of the SBCH to zero. If either of the two buffers in the MCH 11n is available, the MCH 11n carries out the operation in conjunction with the MCHR 6m. At the end of the operation, the MCH 11n sends a normal-end response to the CHP 10. The CHP 10 forwards the response to the BPU 2. In turn, the BPU 2 sets to 0 the BUSY bit of the flag in the SBCH regarding the message operation, sets the END bit therein to 1, and writes status data indicating that the operation has normally ended. The BPU 2 then terminates the synchronous instruction issued by the PRG 9 and proceeds to execute the instruction in the next stage of the PRG 9. The foregoing description has shown an overall flow of synchronous message operation processing, as depicted in FIG. 7.

Figure 6:
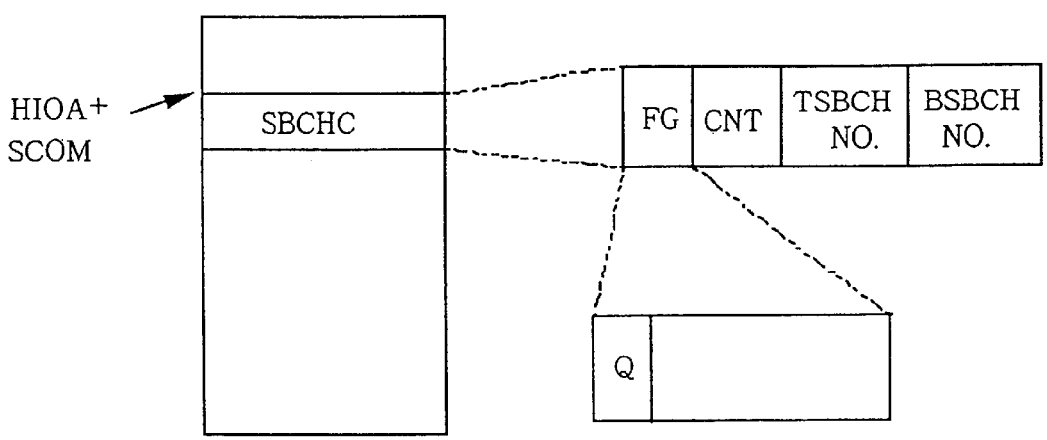
FIG. 6 is a diagram showing a format of a subchannel chain (SBCHC) entry.

What follows is a description of asynchronous message operation processing. The steps are the same as in the processing of synchronous message operations up to the stage where the PRG 9 initiates an asynchronous message operation. In this case, the A bit in the operation block should be set to 1. When the asynchronous instruction is issued, the BPU 2 judges the A bit of the operation block to be 1 and finds that the operation is asynchronous. The BPU 2 references an SCOM field of the directory information at the address indicated by the HIOA in the HSA, and retrieves the address defined as HIOA+SCOM. The location indicated by the retrieved address points to an area that accommodates an SBCHC (subchannel chain) entry of queuing information about asynchronous operations. FIG. 6 shows a typical format of the SBCHC.

Figure 8:
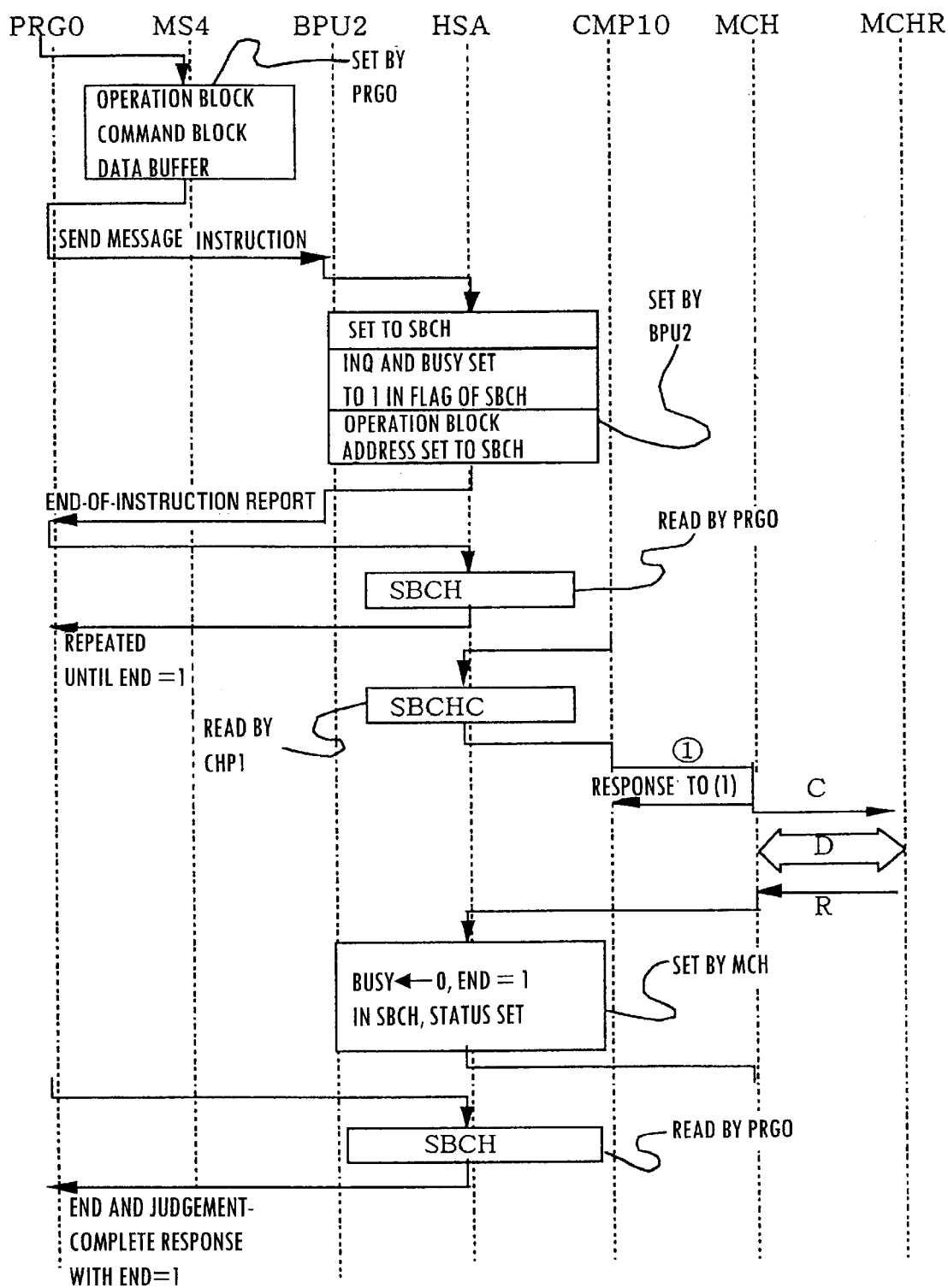
FIG. 8 is a timing chart of asynchronous processing sequences.

The SBCHC entry includes an FG field containing a Q bit indicating whether a queue exists, a TSBCHNO field holding the first of queued SBCH numbers, and a BSBCHNO field retaining the last of the queued SBCH numbers. When the asynchronous operation instruction is issued, the BPU 2 first references the SBCHC entry of the HSA. If the Q bit of the FG field is found to be 0, the BPU 2 stores the SBCH number of the target SBCH into the TSBCHNO and BSBCHNO fields, and sets the Q bit of the FG field to 1. If the Q bit of the FG field is found to be 1, the BPU 2 stores the SBCH number of the target SBCH into the NSBCHNO area of the SBCH entry indicated by the BSBCHNO, and also stores the same SBCH number into the BSBCHNO field of the SBCHC entry. The BPU 2 then sets to 1 the INQ bit and BUSY bit of the flag in the target SBCH, and stores the operation block address into the SBCH entry. If the asynchronous instruction is to be queued, a CNT area in the SBCHC entry is incremented by 1. When an instruction is dequeued from the queue, the value of the CNT area in the SBCHC is decremented by 1. That is, the CNT area in the SBCHC contains the current number of asynchronous instructions yet to be carried out by hardware. Thereafter, the BPU 2 causes the PRG 9 to terminate the asynchronous instruction and proceeds to perform the instruction of the next step. The asynchronous instruction in question has yet to end at this point. Then, the PRG 9 references the flag of the SBCH in question and checks to see if the END bit is set to 1. The CHP 10 references the FG field of the SBCHC entry periodically and, if the Q bit is found to be 1, dequeues the instruction from the queue. The CHP 10 first checks to see if the TSBCHNO and the BSBCHNO of the SBCHC coincide with each other. In the event of a coincidence, the CHP 10 sets the Q bit of the flag in the SBCHC to 0. In case of a mismatch between the TSBCHNO and the BSBCHNO, the CHP 10 references the SBCH indicated by the TSBCHNO, and places the value held in the NSBCHNO of the SBCH into the TSBCHNO of the SBCHC. The CHP 10 then performs the processing regarding the SBCH number held in the TSBCHNO. (At this point, the value in the CNT area of the SBCHC is decremented by 1.) The CHP 10 sets the INQ bit of the flag in the SBCH to 0, and selects the MCH 11n to be started on the basis of the path information in the SBCH. When thus started, the MCH 11n retrieves the operation block address in the SBCH from the SBCH number handed over from the CHP 10. The remaining steps are the same as in the case of the asynchronous instruction described above. If both buffers of the MCH 11n in question are busy, the CHP 10 is notified thereof. Given the buffer-busy notice, the CHP 10 does not respond to the BPU 2 as opposed to the case of the synchronous instruction. Instead, the CHP 10 enters the instruction into the queue in the same manner in which the BPU 2 has queued SBCH numbers. (At this point, the value of the CNT area in the SBCHC is incremented by 1.) Upon elapse of a predetermined period, the CHP 10 again dequeues the instruction and attempts to execute it. If one of the buffers is available and selected to process the asynchronous operation, the MCH 11n returns a normal response to the CHP 10. Upon receipt of the normal response, the CHP 10 terminates the operation in question. The MCH 11n carries out the operation in conjunction with the MCHR 6m. At the end of the operation, the MCH 11n writes status data in the SBCH, sets the BUSY bit of the flag to 0, and sets the END bit therein to 1. When finding the END bit to be 0, the PRG 9 recognizes the end of the operation. The above description has shown an overall flow of asynchronous message operation processing, as depicted in FIG. 8.

Figure 11:
FIG. 11 is a diagram showing a format of the MESSAGE NOTIFICATION instruction.
Figure 12:
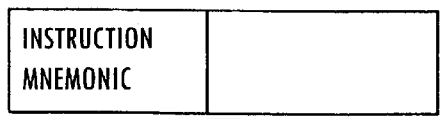
FIG. 12 is a diagram showing a format of the TEST & RESERVE instruction.

A synchronous message operation can become nonexecutable and result in a failure depending on the buffer status of the MCH 11n. To make sure that the synchronous message operation is carried out unfailingly, two specific instructions are provided: a MESSAGE NOTIFICATION (MN) instruction used by the PRG 9 to notify the hardware (BPU 2, IOP 1, etc.) of the execution of a synchronous message operation, and a TEST & RESERVE (T/R) instruction used by the PRG 9 to check the buffer status of the MCH 11n in question and, if one of the buffers is found available, to secure the available buffer. An outline of the two instructions is depicted in FIGS. 9, 11 and 12.

Before carrying out a synchronous message operation, the PRG 9 issues the MN instruction. It should be noted that an operand of the MN instruction needs to specify an SBCH number (see FIG. 11). Upon receipt of the MN instruction, the BPU 2 starts via the CHP 10 the MCH 11n included in the path information held in the designated SBCH. In the activation step, the CHP 10 starts the designated MCH 11n. The MCH 11n thus started checks consecutively the reserve bits of the flags in buffer control areas inside the work memory 11n6. If any reserve bit is found to be 1, the flag of the next buffer control area is referenced. If the reserve bits of the flags in all buffer control areas are found to be 1 each, the MCH 11n sends to the CHP 10 a response indicative of the bit status. In turn, the CHP 10 forwards the response to the BPU 2. The BPU 2 ends the MN instruction without executing it, its condition code being always 0. As described, the MN instruction alone does not necessarily ensure unfailing execution of a synchronous instruction, but it does enhance the probability of the instruction being executable. If any reserve bit of the flag in a buffer control area of the MCH 1in is found to be 0, that bit is set to 1, the MCH 11n returns a response reflecting the bit status to the CHP 10 which forwards the response to the BPU 2. Executing the MN instruction simply allocates resources for carrying out a message operation, with no specific buffer designated inside the MCH 11n. When another asynchronous SEND MESSAGE instruction is later issued, the MCH 11n regards the reserve bits as BUSY bits. That is, if all buffers in the MCH 11n are busy or reserved, the asynchronous SEND MESSAGE instruction is again entered into the queue. When a synchronous SEND MESSAGE instruction ends in its execution, the reserve bit of the flag in the buffer control area inside the work memory 11n6 of the MCH 11n is set to 0.

The TEST & RESERVE instruction is issued in advance so as to ensure that a synchronous message instruction will be carried out unfailingly. An operand of the TEST & RESERVE instruction is required to designate an SBCH number (see FIG. 12). Upon receipt of the instruction, the BPU 2, starts via the CHP 10 starts, the MCH 11n included in the path information held in the designated SBCH. In the activation step, the CHP 10 starts the designated MCH 11n. If all buffers are found to be busy, the MCH 11n sends an all-buffer-busy response to the CHP 10. The CHP 10 forwards the response to the BPU 2. On receiving the response, the BPU 2 checks the path information in the SBCH designated by the PRG 9 to see if there exist any remaining paths. If any such path is found to exist, that path is again activated. If no such path is detected, the no-path status is reflected in the condition code (=2) of the instruction in question, whereby the PRG 9 is notified of the absence of the paths. The PRG 9 thus recognizes the absence of available buffers by which to carry out the target synchronous operation. In that case, the PRG 9 either changes the operation into an asynchronous type or again issues, upon elapse of a predetermined period, the TEST & RESERVE instruction. If any available buffer exists for the MCH 11n, the MCH 11n sets to 1 the reserve bit of the flag in the buffer control area inside the work memory 11n6 with respect to the buffer in question. The setting of the reserve bit is reported to the PRG 9 via the CHP 10 and BPU 2 (condition code=2). That reserve bit remains valid until a synchronous instruction is encountered. The bit is brought to 0 after the execution of the synchronous instruction has ended. If the reserve bit is 1 when an asynchronous instruction operation is started, the corresponding buffer is regarded as busy. Thus, if the other buffer is also busy, an operation-nonexecutable response is returned to the CHP 10 as described above. This causes the CHP 10 to enter the asynchronous operation again into the queue.

Figure 9:
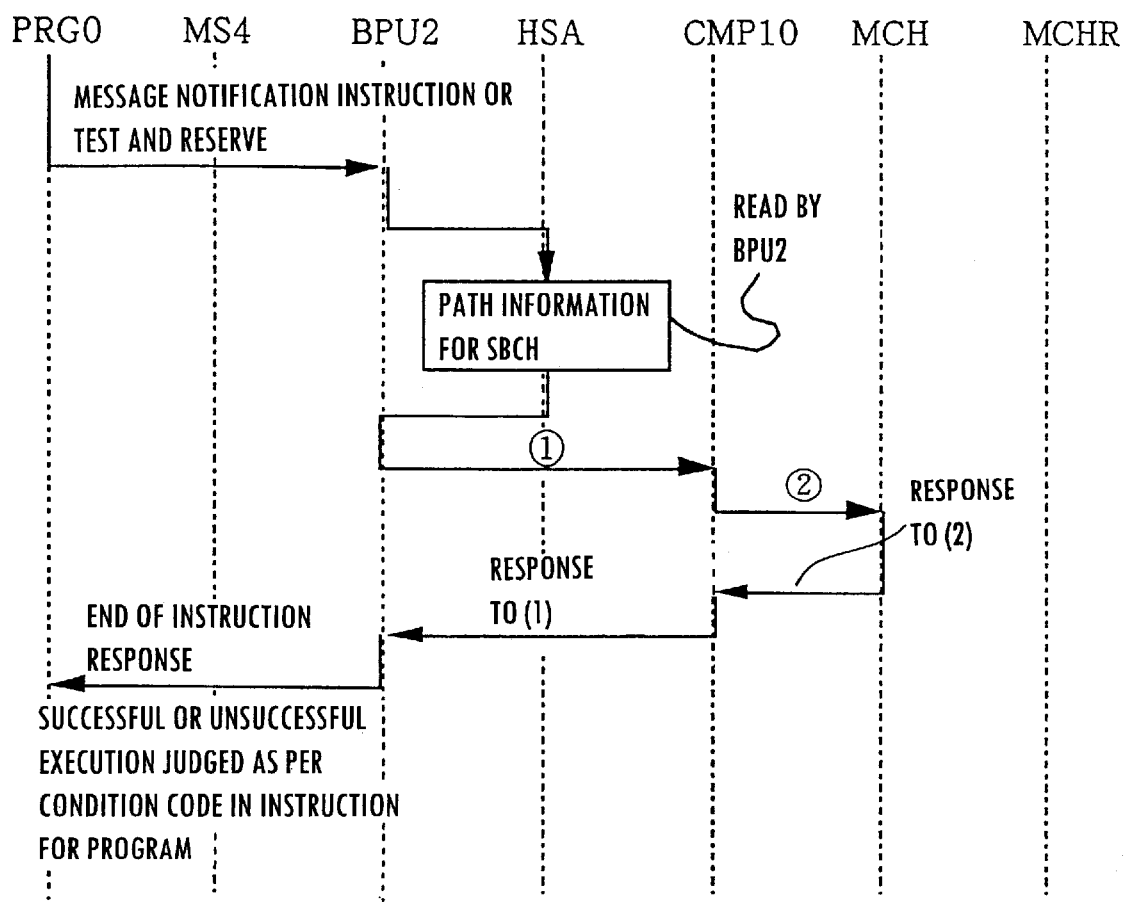
FIG. 9 is a time chart showing processing sequences of a MESSAGE NOTIFICATION instruction and a TEST & RESERVE instruction.

FIG. 9 shows a typical flow of processing of the MESSAGE NOTIFICATION instruction and the TEST & RESERVE instruction.

One of the two buffers possessed by the MCH 11n may be allocated to synchronous processing and the other to asynchronous processing. For example, the BUF #0–11n70 in the MCH 11n is allocated for synchronous operations (an ALLOC bit is set to 1 in the buffer control area of the work memory 11n6 in the MCH 11n), and the BUF #1–11n71 is allocated for asynchronous operations. If an asynchronous operation is being performed in the BUF #1–11n71 (the BUSY bit is 1 in the flag of that buffer control area in the work memory 11n6 which corresponds to the BUF #1) while no synchronous operation is carried out in the BUF #0–11n70 (the BUSY bit is 0 in the flag of that buffer control area in the work memory 11n6 which corresponds to the BUF #0), an attempt to start an asynchronous operation fails because no allocated buffer is available. An operation-nonexecutable response is thus returned to the CHP 10. That is, the MCH 11n judges a given buffer to be free when the ALLOC bit, BUSY bit and reserve bit are all found to be 0 in the buffer control area.

With the above feature added, the hardware always has specific hardware resources allocated to synchronous instructions. This boosts the probability of synchronous instructions being executed.

In the above example, the total throughput of the system is liable to drop because a growing load of asynchronous message operations can increase the number of asynchronous message operations being queued. This potential bottleneck is circumvented by reallocating for asynchronous message operations the buffer (BUF #0–11n70 in this example) that has been dedicated to synchronous message operations in case the number of asynchronous message operations being queued has exceeded a predetermined threshold value. This requires checking the CNT area in the SBCHC entry every time the CHP 10 dequeues an asynchronous message operation. When the CNT value is found to exceed the predetermined value, the MCH 11n is notified thereof upon activation of the operation in question. Given the notice, the MCH 11n ignores the ALLOC bit of the buffer control area in the work memory 11n6 and checks only the BUSY bit and reserve bit. If the two bits are found to be 0 each, the available buffer meeting the bit conditions is used to execute the operation.

As described, when the number of asynchronous operations being queued in the hardware has exceeded a predetermined value, the hardware resources dedicated so far to synchronous instructions are reallocated by hardware to the processing of asynchronous instructions. This makes it possible to reduce adverse effects on asynchronous instructions to a negligible level even when part of the hardware resources are allocated for synchronous instructions.

The present invention, when embodied as described, guarantees the unfailing execution of synchronous instructions for programs as well as for data processing apparatuses having hardware capable of executing the same instruction either synchronously or asynchronously. The means provided for the guaranty of synchronous instruction execution are designed to minimize any adverse effects on the processing of asynchronous instructions.

Figure 3:
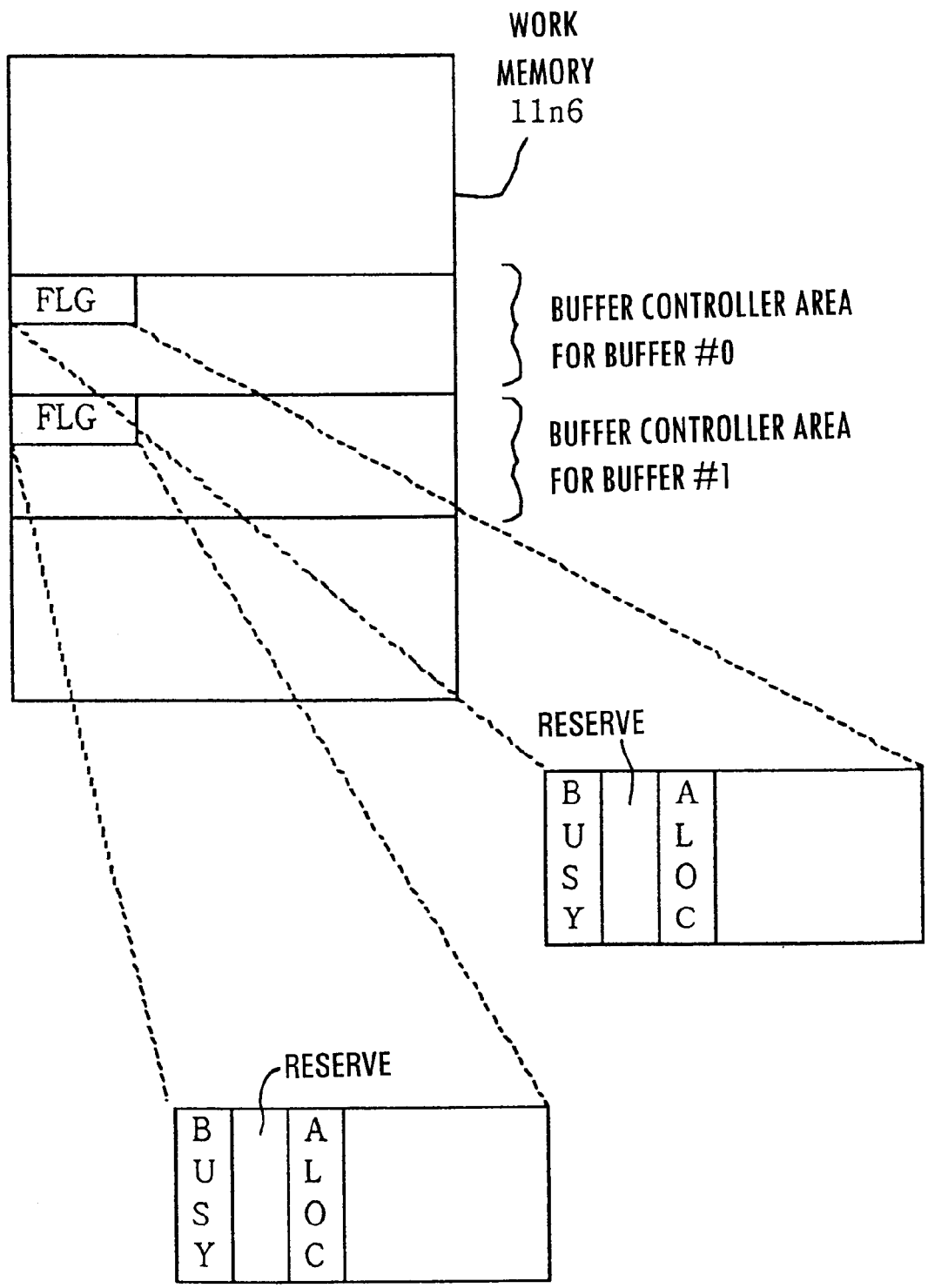
FIG. 3 is a diagram of a work memory in the message channel unit.

FIG. 1
A) HOST A/B
7) SES MANAGING UNIT
8) SES CACHE
FIG. 2
11n1) CHP INTERFACE
11n2) MEMORY ACCESS UNIT
11n3) PROCESSOR UNIT
11n4) INTERFACE UNIT
11n5) CONTROL STORAGE
11n6) WORK MEMORY
11n7) BUFFER CONTROLLER
6m1) UP-IF UNIT
6m2) MEMORY ACCESS UNIT
6m3) PROCESSOR UNIT
6m4) INTERFACE UNIT
6m5) CONTROL STORAGE
6m6) WORK MEMORY
6m7) BUFFER CONTROLLER
7) SES MANAGING UNIT
8) SES CACHE
FIG. 3
1) BUFFER CONTROL AREA FOR BUF #0/#1
2) RESERVE
FIG. 4
1) USER AREA
2) DIRECTORY INFORMATION
3) COMMON MANAGEMENT INFORMATION
4) SUBCHANNEL (SBCH)
5) BPU-CHP COMMUNICATION AREA
6) CHP-CH COMMUNICATION AREA
FIG. 5
1) HIOA+SSBCH+SBCH NUMBER×128
2) SBCH ENTRY (128 BYTES)
3) SBCH NUMBER
4) PATH INFORMATION
5) OPERATION BLOCK ADDRESS
FIG. 7
1) OPERATION BLOCK // COMMAND BLOCK // DATA BUFFER
2) WRITTEN BY PRG 9
3) SEND MESSAGE INSTRUCTION
4) SET BY BPU 2
5) BUSY←1 IN SBCH
6) READ BY MCH
7) STATUS SET IN SBCH
8) SET BY MCH
9) RESPONSE TO (2)
10) RESPONSE TO (1)
11) BUSY←0, END←1 IN SBCH
12) SET BY BPU 2
13) END-OF-INSTRUCTION RESPONSE
FIG. 8
1) OPERATION BLOCK // COMMAND BLOCK // DATA BUFFER
2) SET BY PRG 0
3) SEND MESSAGE INSTRUCTION
4) SET TO SBCHC
5) INQ AND BUSY SET TO 1 IN FLAG OF SBCH
6) OPERATION BLOCK ADDRESS SET TO SBCH
7) SET BY BPU 2
8) END-OF-INSTRUCTION REPORT
9) READ BY PRG 0
10) REPEATED UNTIL END=1
11) READ BY CHP 10
12) RESPONSE TO (1)
13) BUSY←0, END=1 IN SBCH, STATUS SET
14) SET BY MCH
15) READ BY PRG 0
16) END AND JUDGMENT-COMPLETE RESPONSE WITH END=1
FIG. 9
1) MESSAGE NOTIFICATION INSTRUCTION OR TEST & RESERVE INSTRUCTION
2) PATH INFORMATION FOR SBCH
3) READ BY BPU 2

4) RESPONSE TO (2)
5) RESPONSE TO (1)
6) END-OF-INSTRUCTION RESPONSE
7) SUCCESSFUL OR UNSUCCESSFUL EXECUTION JUDGED AS PER CONDITION CODE IN INSTRUCTION FOR PROGRAM

FIG. 10
1) INSTRUCTION MNEMONIC
2) OPERATION BLOCK ADDRESS+SBCH NUMBER
3) COMMAND BLOCK ADDRESS
4) DATA BUFFER ADDRESS
5) OPERATION BLOCK
6) COMMAND
7) COMMAND BLOCK
8) DATA BUFFER

FIG. 11
1) MESSAGE NOTIFICATION INSTRUCTION
2) INSTRUCTION MNEMONIC
3) SBCH NUMBER
4) CONDITION CODE=0; END
5) !b 0; UNDEFINED

FIG. 12
1) TEST & RESERVE INSTRUCTION
2) INSTRUCTION MNEMONIC
3) SBCH NUMBER
4) CONDITION CODE=0; BUFFER AVAILABLE
5) =2; BUFFER UNAVAILABLE
6) !b =0, 2; UNDEFINED

What is claimed is:

1. A data processing apparatus which has hardware resources for executing instructions from a program synchronously and asynchronously and which allows either synchronous or asynchronous execution of instructions to be designated by an instruction from said program, said data processing apparatus comprising:

queuing and executing means for entering an asynchronous instruction issued by said program into a queue and later executing said asynchronous instruction using said hardware resources at an appropriate time;

notifying means for allowing said program to notify in advance said hardware resources of an execution of a synchronous instruction;

checking means for checking the status of notification in effect when an asynchronous instruction is to use said hardware resources; and judging means for use when said program issues an instruction notifying in advance said data processing apparatus of the intended execution of a synchronous instruction using said hardware resources, said judging means judges whether said hardware resources are already in use, wherein, if said hardware resources are judged to be available, said notifying means allows said program to reserve said hardware resources for the intended execution of the synchronous instruction.

2. A data processing apparatus according to claim 1, further comprising:

means for allowing part of said hardware resources to be dedicated to executing synchronous instructions.

3. A data processing apparatus according to claim 2, further comprising:

assigning means for use when a plurality of asynchronous instructions are issued to said hardware resources and the number of said asynchronous instructions has exceeded a predetermined number of asynchronous instructions that may be queued, said assigning means thereupon assigning that part of said hardware resources which has been dedicated to executed said synchronous instructions to the processing of asynchronous instructions.

4. A data processing apparatus according to claim 1, wherein said notifying means allows said program to notify said hardware resources by setting a reserve bit.

5. A data processing apparatus according to claim 2, wherein said notifying means allows said program to notify said hardware resources by setting a reserve bit.

* * * * *